United States Patent
Srivastava et al.

(10) Patent No.: US 11,326,099 B2
(45) Date of Patent: May 10, 2022

(54) CERAMIC SCINTILLATOR BASED ON CUBIC GARNET COMPOSITIONS FOR POSITRON EMISSION TOMOGRAPHY (PET)

(71) Applicant: GE PRECISION HEALTHCARE LLC, Wauwatosa, WI (US)

(72) Inventors: Alok Mani Srivastava, Niskayuna, NY (US); Sergei Ivanovich Dolinsky, Clifton Park, NY (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 154 days.

(21) Appl. No.: 16/668,299

(22) Filed: Oct. 30, 2019

(65) Prior Publication Data

US 2021/0130688 A1 May 6, 2021

(51) Int. Cl.
| | | |
|---|---|---|
| *C09K 11/77* | (2006.01) | |
| *C01F 17/34* | (2020.01) | |
| *G01T 1/202* | (2006.01) | |
| *C09B 35/50* | (2006.01) | |
| *C04B 35/44* | (2006.01) | |
| *C04B 35/48* | (2006.01) | |
| *C04B 35/46* | (2006.01) | |

(52) U.S. Cl.
CPC .......... *C09K 11/7774* (2013.01); *C01F 17/34* (2020.01); *C04B 35/44* (2013.01); *C04B 35/46* (2013.01); *C04B 35/48* (2013.01); *C09B 35/50* (2013.01); *G01T 1/2023* (2013.01); *C01P 2002/30* (2013.01); *C01P 2002/54* (2013.01); *C01P 2006/60* (2013.01)

(58) Field of Classification Search
CPC ... C09K 11/7774; C01F 17/34; G10T 1/2023; C04B 35/44; C04B 35/48; C04B 35/46; C04B 35/50
See application file for complete search history.

(56) References Cited

U.S. PATENT DOCUMENTS

| | | | |
|---|---|---|---|
| 6,479,420 B2 | 11/2002 | Nakamura | |
| 8,957,575 B2 * | 2/2015 | Oshio | C09K 11/7792 |
| | | | 313/503 |
| 8,969,812 B2 | 3/2015 | Yoshikawa et al. | |
| 10,000,698 B2 | 6/2018 | Cherepy et al. | |
| 10,371,831 B2 | 8/2019 | Shah et al. | |
| 2017/0218267 A1 * | 8/2017 | Zhuang | C09K 11/7792 |

FOREIGN PATENT DOCUMENTS

| | | | |
|---|---|---|---|
| CN | 106520119 | * | 3/2017 |
| CN | 106588012 A | | 4/2017 |
| CN | 105418063 B | | 12/2017 |

OTHER PUBLICATIONS

Translation for CN 106520119, Mar. 2017.*
Pidol et al., "Scintillation Properties of Lu2Si2O7:Ce3+, a Fast and Efficient Scintillator Crystal", Condensed Matter, vol. 15, Issue: 12, pp. 2091-2102, Mar. 17, 2003.
Cherepy et al., "Transparent Ceramic Scintillators for Gamma Spectroscopy and Radiography", Hard X-Ray, Gamma-Ray, and Neutron Detector Physics XIV, SPIE Optical Engineering + Applications, 2012, San Diego, California, United States, vol. 7805, pp. 1-7, Sep. 20, 2010.
Wang et al., "Transparent Garnet Ceramic Scintillators for Gamma-Ray Detection", Hard X-Ray, Gamma-Ray, and Neutron Detector Physics XIV, SPIE Optical Engineering + Applications, 2012, San Diego, California, United States, vol. 8507,pp. 08, Oct. 24, 2012.

* cited by examiner

*Primary Examiner* — C Melissa Koslow
(74) *Attorney, Agent, or Firm* — Armstrong Teasdale LLP

(57) ABSTRACT

A scintillator for positron emission tomography is provided. The scintillator includes a garnet compound of a formula of $A_3B_2C_3O_{12}$ and an activator ion consisting of cerium. $A_3$ is $A_2X$. X consists of at least one lanthanide element. $A_2$ is selected from the group consisting of (i), (ii), (iii), and any combination thereof, wherein (i) consists of at least one lanthanide element, (ii) consists of at least one group I element selected from the group consisting of Na and K, and (iii) consists of at least one group II element selected from the group consisting of Ca, Sr, and Ba. $B_2$ consists of Sn, Ti, Hf, Zr, and any combination thereof. $C_3$ consists of Al, Ga, Li, and any combination thereof. The garnet compound is doped with the activator ion.

8 Claims, 2 Drawing Sheets

CERAMIC SCINTILLATOR BASED ON CUBIC GARNET COMPOSITIONS FOR POSITRON EMISSION TOMOGRAPHY (PET)

BACKGROUND

The field of the disclosure relates generally to scintillator materials for use in positron emission tomography (PET), and more particularly, to garnet-based scintillator materials for PET that emit photons with high intensity and with reduced manufacturing costs.

PET systems are commonly used imaging systems for cancer testing and other applications. In PET, inorganic scintillator crystals are used to record γ-rays produced by the annihilation of positrons emitted by injected tracers in a subject. The ultimate performance of the imaging system is strongly tied to both the physical and scintillation properties of the crystals. Therefore, efficient scintillator materials that emit photons with high intensity and with decreased manufacturing costs are desirable.

BRIEF DESCRIPTION

In one aspect, a scintillator for positron emission tomography is provided. The scintillator includes a garnet compound of a formula of $A_3B_2C_3O_{12}$ and an activator ion consisting of cerium. $A_3$ is $A_2X$. X consists of at least one lanthanide element. $A_2$ is selected from the group consisting of (i), (ii), (iii), and any combination thereof, wherein (i) consists of at least one lanthanide element, (ii) consists of at least one group I element selected from the group consisting of Na and K, and (iii) consists of at least one group II element selected from the group consisting of Ca, Sr, and Ba. $B_2$ consists of Ti, Sn, Hf, Zr, and any combination thereof. $C_3$ consists of Al, Ga, Li, and any combination thereof. The garnet compound is doped with the activator ion.

In another aspect, a compound is provided. The compound includes a garnet compound of a formula of $A_3B_2C_3O_{12}$ and an activator ion consisting of cerium. $A_3$ is $A_2X$. X consists of at least one lanthanide element. $A_2$ is selected from the group consisting of (i), (ii), (iii), and any combination thereof, wherein (i) consists of at least one lanthanide element, (ii) consists of at least one group I element selected from the group consisting of Na and K, and (iii) consists of at least one group II element selected from the group consisting of Ca, Sr, and Ba. $B_2$ consists of Sn, Ti, Hf, Zr, and any combination thereof. $C_3$ consists of Al, Ga, Li, and any combination thereof. The garnet compound is doped with the activator ion.

DRAWINGS

DETAILED DESCRIPTION

Figure 1:
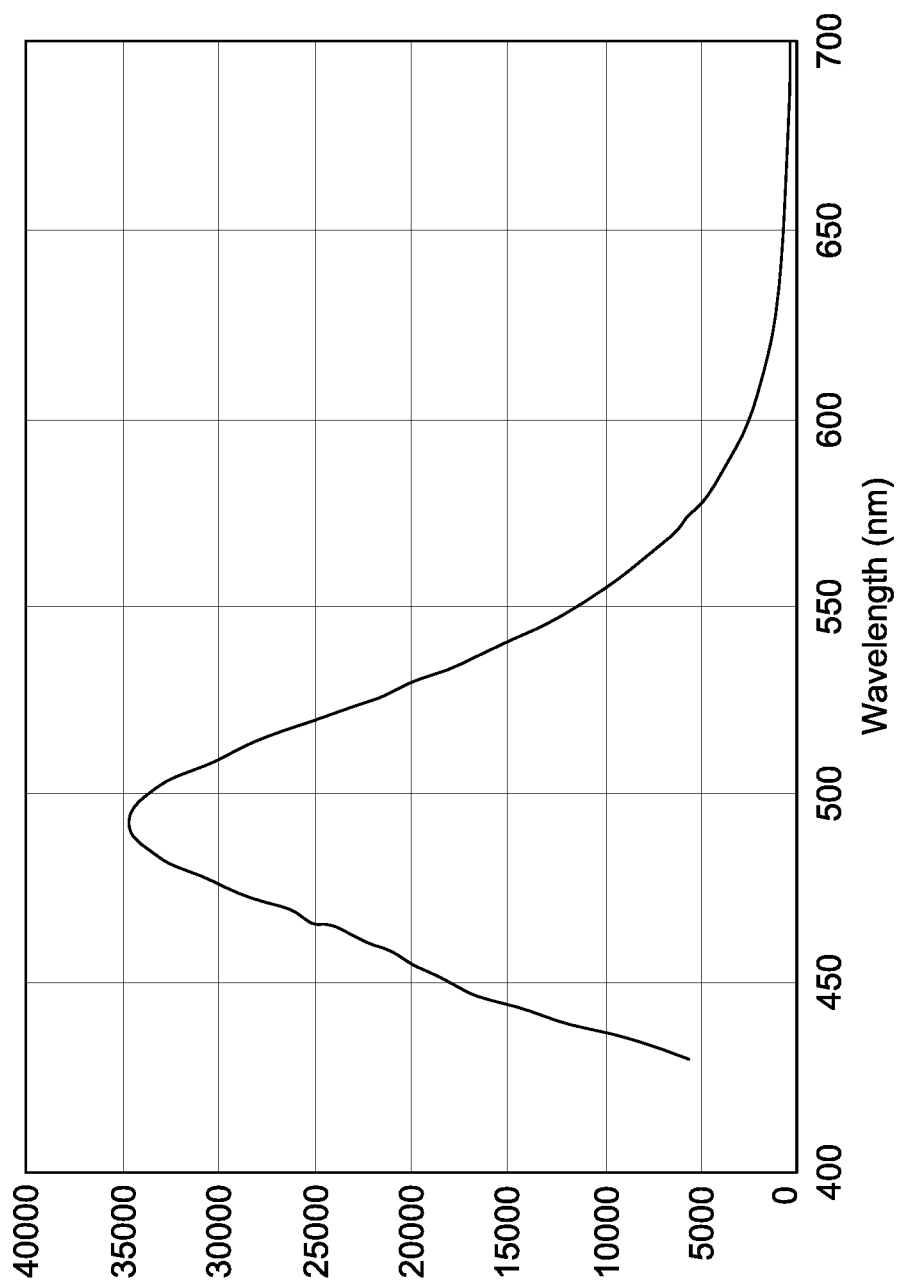
FIG. 1 is an emission spectrum of an exemplary compound.

Exemplary embodiments of compounds used as scintillator materials for positron emission tomography (PET) are described herein. The scintillator materials as disclosed herein are garnet-based and configured to emit photons with high intensity. The emission spectrum of the scintillator materials matches the wavelength of maximum photomultiplier sensitivity, which increases the efficiency of a PET imaging system implemented using those scintillator materials. Further, the manufacturing costs of the scintillator materials are reduced as compared to at least some known scintillator materials. In addition, a higher amount of activator ion can be doped in the scintillator materials described herein to further increase the signal intensity.

A scintillator is a material with the ability to absorb ionizing radiation, such as x- or γ-rays, and to convert a fraction of the absorbed energy into visible or ultraviolet photons. The conversion process typically takes place on a time scale of nanoseconds to microseconds, thus producing a fast pulse of photons corresponding to each γ- or x-ray that interacts with the scintillator material. The light pulse, the intensity of which is usually proportional to the energy deposited in the scintillator, is sensed by a photodetector and converted into an electrical signal.

Scintillators may be liquid or solid, organic or inorganic, and crystalline or noncrystalline. Organic liquid and plastic scintillators are often used for detection of β particles and fast neutrons. For the detection of x- and γ-rays, such as 511 kiloelectron Volts (keV) γ-rays used in PET, inorganic single-crystal scintillators are often used, because of their generally higher density and atomic number, which generally results in improved detection efficiency.

A typical scintillator is a transparent single crystal in which valence and conduction bands are separated by a band gap of 5 eV or more. In a crystal free of defects or impurities, there would be no electronic energy levels in this gap. Scintillators, however, are doped with an activator ion that provides energy levels in this band gap. After absorption of γ-ray energy by the bulk crystal, a fraction of the energy localizes on the activator ions. Relaxation of the activator ions results in the emission of scintillation photons, typically around 3 eV, corresponding to visible blue light.

One commonly used scintillator material is bismuth germanate ($Bi_4Ge_3O_{12}$ or BGO) because of its much greater efficiency for detecting γ-ray than thallium-doped sodium iodide (NaI[Tl]), which was used in the early years of PET. Another commonly used material is single crystal cerium-doped lutetium oxyorthosilicate ($Lu_2SiO_5$[Ce] or LSO), which provides much greater overall efficiency than BGO. One drawback of LSO material, however, is that the process of manufacturing single crystal scintillators of LSO is expensive, because it requires high temperatures (e.g., 2000° C.) and iridium crucibles. Therefore, there is a need for scintillator materials of relatively low cost with improved or comparable performance.

The scintillator materials disclosed herein are garnet based. In the exemplary embodiment, they have a formula of $A_3B_2C_3O_{12}$, where $A_3$ is $A_2X$, and X consists of at least one lanthanide element. Lanthanide elements are chemical elements including 15 metallic chemical elements with atomic numbers 57 through 71, which are from lanthanum (La) through lutetium (Lu). Lanthanide elements are suitable for being used as PET scintillator material because of their high atomic numbers. In the exemplary embodiment, $A_2$ is selected from the group consisting of (i), (ii), (iii), and any combination thereof, where: (i) consists of at least one lanthanide element, (ii) consists of at least one group I element selected from the group consisting of Na and K, and (iii) consists of at least one group II element selected from the group consisting of Ca, Sr, and Ba. In the exemplary embodiment, $B_2$ consists of Sn, Ti, Hf, Zr, and any combination thereof, and $C_3$ consists of Al, Ga, Li, and any combination thereof. The scintillator materials described herein include this garnet compound doped with an activator ion, such as cerium. The cerium may be in trivalent oxidation state ($Ce^{3+}$).

In one exemplary embodiment, X is Lu. In some embodiments, the scintillator material includes a compound having a formula of $A_2LuB_2C_3O_{12}$, where $A_2$ consists of Ca, Sr, Ba, and any combination thereof. For example, one scintillator material may be a garnet-type compound represented by $Ca_2LuHf_2Al_3O_{12}$. In some embodiments, the scintillator material includes a compound represented by $Lu_3B_2C_3O_{12}$. Another example scintillator material is a garnet-type compound represented by $Lu_3Hf_2LiAl_2O_{12}$. In some embodiments, the scintillator material includes a compound represented by $ALu_2B_2C_3O_{12}$, where A consists of Na and K. Another example scintillator material is a garnet-type compound represented by a formula of $NaLu_2Hf_2Al_3O_{12}$.

In the exemplary embodiment, the garnet-based scintillator material forms a cubic crystal structure. Because of this cubic structure, the compositions can be fabricated as transparent ceramic scintillators by a hot isostatic processing (HIP) process. The HIP process is generally less expensive than the process used in manufacturing a single crystal like LSO because it does not require temperature as high or require expensive iridium crucibles. In some embodiments, x-ray diffraction (XRD) is used to examine if a desired crystal has been formed by the manufacturing process.

Instead of a single crystal as formed by LSO scintillator material, the garnet-based scintillator material disclosed herein forms a ceramic, which is a polycrystalline material. Compared to a single crystal scintillator, a ceramic scintillator allows for a more uniform distribution coefficient of a doping agent, like cerium, and, thus, provides better energy resolution of the detectors. Also, because of this property, more doping agent, such as activator ions, can be doped in the garnet compound, further increasing the intensity of the emitted photons. For single crystal LSO scintillator, 1 mol. % to 2 mol. % of cerium may be the doping limit in the LSO compound for PET scanners. In comparison, 0.5 mol. % to 10 mol. % of cerium may be the doping limit in a garnet compound. In some embodiments, 2 mol. % to 3 mol. % of cerium is doped in a garnet compound.

In PET scanners, the emitted photons of the scintillation crystals are converted to electrical signals by photomultiplier tubes (PMTs) or silicon photomultipliers (SiPMs). To produce the largest signal, the scintillation emission should be relatively intense, and the wavelength of the emission should match the wavelength of maximum photomultiplier sensitivity. Because the PMTs and SiPMs can be tuned to have a maximum sensitivity in a wavelength range from 300 nanometers (nm) to 600 nm, it is advantageous for the scintillator to have its emission maximum within this range of wavelengths.

FIG. 1 shows an emission spectrum of an exemplary compound with emission intensity (in an arbitrary unit in FIG. 1) as a function of wavelength. This particular compound is $Ca_2LuHf_2Al_3O_{12}$. As shown in FIG. 1, the spectrum peaks at approximately 500 nm, well within the wavelength range of 300 nm to 600 nm.

The intensity of the scintillation emission strongly affects the number of crystal elements that can be coupled to a single photosensor or, stated another way, the ratio of scintillation elements to electronic channels. The more intense the scintillation emission from the scintillator material is, the less electronic channels are needed to reach a desired signal to noise ratio. Reducing the number of electronic channels may result in significant cost savings. Because of the high intensity photons emitted from the scintillator materials disclosed herein, a reduced number of readout electronics channels can be realized. Also the higher intensity scintillator improves timing resolution of PET detectors, which significantly improves the image quality and may be used to reduce injected dose or scanning time.

It is also generally desirable for scintillator materials to have a high density, which leads to increased detection efficiency. The compounds disclosed herein have a comparable density to LSO scintillator materials. Compounds of $Ca_2LuHf_2Al_3O_{12}$ and of $Lu_3Hf_2LiAl_2O_{12}$ have a calculated density of 5.9 grams per cubic centimeter ($g/cm^3$) to 6 $g/cm^3$. Further, a compound of $NaLu_2Hf_2Al_3O_{12}$ has a calculated density of 7 $g/cm^3$. All of the calculated densities above are comparable to that of an LSO scintillator material having a density of 7.4 $g/cm^3$.

Figure 2:
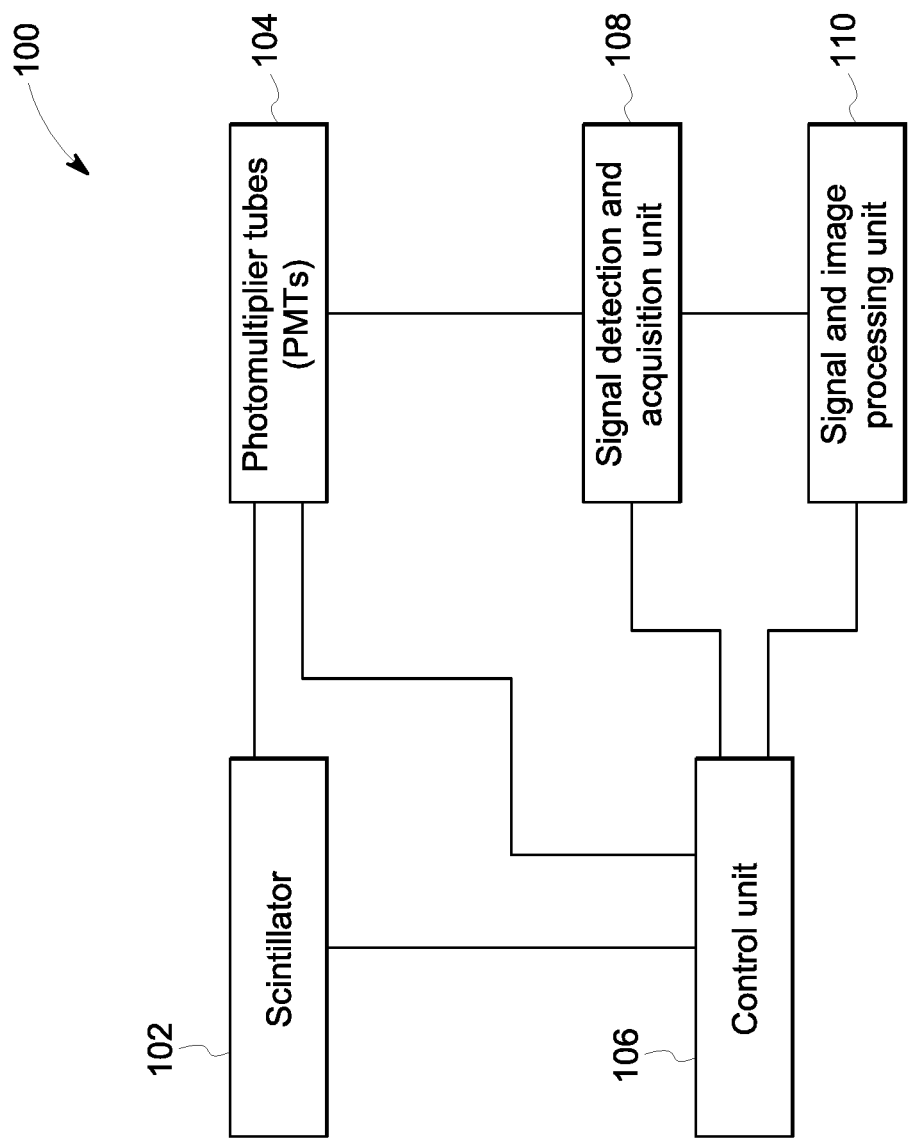
FIG. 2 is a block diagram of a PET imaging system that may be implemented using the exemplary compound.

FIG. 2 is a block diagram of an exemplary PET imaging system 100. System 100 includes a scintillator 102, PMTs 104, a control unit 106, a signal detection and acquisition unit 108, and a signal and image processing unit 110. Scintillator 102 includes scintillation materials that convert γ-rays emitted from a subject to photons, such as the scintillation materials described herein. PMTs 104 convert the photons to electrical signals, which are then acquired, processed, and converted to digital signals through signal detection and acquisition unit 108. Images of the subject are generated based on the outputted digital signals using signal and image processing unit 110. Control unit 106 controls the operation of system 100.

At least one technical effect of the compounds, systems and methods described herein includes (a) increasing signal intensity in a PET detector, (b) increasing efficiency of a PET system, (c) lowering manufacturing costs of PET scintillator materials, and (d) enabling higher amounts of doping agent, such as activator ions, to be doped into scintillator materials.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any compounds, devices, or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

When introducing elements of the present disclosure or the various versions, embodiment(s) or aspects thereof, the articles "a," "an," "the," and "said" are intended to mean that there are one or more of the elements. It is also noted that the terms "comprising", "including", "having," or "containing" are intended to be open and permits the inclusion of additional elements or steps.

What is claimed is:
1. A compound comprising:
    a garnet compound of a formula of $A_3B_2C_3O_{12}$,
        wherein $A_3$ consists of Lu, wherein $B_2$ consists of Sn, Ti, Hf, Zr, and any combination thereof, and wherein $C_3$ consists of Al, Ga, Li, and any combination thereof; and an activator ion consisting of cerium, wherein the garnet compound is doped with said activator ion, wherein said garnet compound has a formula of $Lu_3B_2C_3O_{12}$.

2. The compound in accordance with claim 1, wherein said garnet compound has a formula of $Lu_3Hf_2LiA_2O_{12}$.

3. The compound in accordance with claim 1, wherein said garnet compound is doped with approximately 0.5 mol. % to approximately 10 mol. % of cerium.

4. The compound in accordance with claim 3, wherein said garnet compound is doped with approximately 2 mol. % to approximately 3 mol. % of cerium.

5. A compound comprising:

a garnet compound of a formula of $A_3B_2C_3O_{12}$, wherein $B_2$ consists of Sn, Ti, Hf, Zr, and any combination thereof, and wherein $C_3$ consists of Al, Ga, Li, and any combination thereof; and an activator ion consisting of cerium, wherein the garnet compound is doped with said activator ion, wherein $A_3$ is $ALu_2$, wherein said garnet compound has a formula of $ALu_2B_2C_3O_{12}$, and wherein A consists of Na and K.

6. The compound in accordance with claim 5, wherein said garnet compound has a formula of $NaLu_2Hf_2Al_3O_{12}$.

7. The compound in accordance with claim 5, wherein said garnet compound is doped with approximately 0.5 mol. % to approximately 10 mol. % of cerium.

8. The compound in accordance with claim 7, wherein said garnet compound is doped with approximately 2 mol. % to approximately 3 mol. % of cerium.

* * * * *